(12) United States Patent
Mays (10) Patent No.: US 10,054,947 B2
(45) Date of Patent: Aug. 21, 2018

(54) EMERGENCY STOPPING FOR AUTONOMOUS COMMERCIAL VEHICLES

(71) Applicant: OMNITRACS, LLC, Dallas, TX (US)

(72) Inventor: Wesley M. Mays, Coppell, TX (US)

(73) Assignee: OMNITRACS, LLC, Dallas, TX (US)

( * ) Notice: Subject to any disclaimer, the term of this patent is extended or adjusted under 35 U.S.C. 154(b) by 0 days.

(21) Appl. No.: 15/239,547

(22) Filed: Aug. 17, 2016

(65) Prior Publication Data
US 2018/0052463 A1 Feb. 22, 2018

(51) Int. Cl.
| B60T 7/12 | (2006.01) |
| G05D 1/02 | (2006.01) |
| B60W 10/18 | (2012.01) |
| B60W 10/20 | (2006.01) |
| B60W 30/00 | (2006.01) |
| G07C 5/08 | (2006.01) |

(52) U.S. Cl.
CPC .............. G05D 1/021 (2013.01); B60T 7/12 (2013.01); B60W 10/18 (2013.01); B60W 10/20 (2013.01); B60W 30/00 (2013.01); G07C 5/0808 (2013.01); G07C 5/0841 (2013.01); *B60W 2300/12* (2013.01); *B60Y 2200/14* (2013.01); *G05D 1/0242* (2013.01); *G05D 1/0246* (2013.01); *G05D 1/0257* (2013.01)

(58) Field of Classification Search
CPC combination set(s) only.
See application file for complete search history.

(56) References Cited

U.S. PATENT DOCUMENTS

| 5,015,189 A | 5/1991 | Wenzinger, Jr. |
| 6,442,511 B1 | 8/2002 | Sarangapani et al. |
| 7,881,863 B2 | 2/2011 | Uyeki et al. |

(Continued)

FOREIGN PATENT DOCUMENTS

| GB | 2530609 A | 3/2016 |
| WO | WO 2006/093452 A1 | 9/2006 |

(Continued)

OTHER PUBLICATIONS

International Search Report and Written Opinion issued in PCT/US2017/045360 dated Nov. 9, 2017.

*Primary Examiner* — Anne M Antonucci
*Assistant Examiner* — Renee LaRose
(74) *Attorney, Agent, or Firm* — Arent Fox LLP (57) ABSTRACT

The present disclosure generally relates to autonomous commercial vehicles. In one aspect, the disclosure provides a method for controlling a commercial highway vehicle. The method includes detecting a failure of a first component based on a first signal from a first sensor. The method also includes classifying, by an automated driving system on the vehicle, a severity of the component failure. The method further includes determining to stop the vehicle if the severity exceeds a threshold severity level. The method also includes determining an emergency stopping distance based on the severity and a current momentum of the vehicle. The method further includes determining a stopping location within the emergency stopping distance. The method also includes stopping the vehicle at the stopping location. The present disclosure also provides an autonomous commercial vehicle and an emergency control system for performing the method.

19 Claims, 4 Drawing Sheets

(56) References Cited

U.S. PATENT DOCUMENTS

| | | |
|---|---|---|
| 7,979,173 B2 | 7/2011 | Breed |
| 8,019,501 B2 | 9/2011 | Breed |
| 8,024,114 B2 | 9/2011 | Doyle |
| 8,334,781 B2 | 12/2012 | Heck et al. |
| 8,660,734 B2 | 2/2014 | Zhu et al. |
| 8,700,251 B1 | 4/2014 | Zhu et al. |
| 8,706,407 B2 | 4/2014 | Tuukkanen |
| 8,874,301 B1 | 10/2014 | Rao et al. |
| 8,874,305 B2 | 10/2014 | Dolgov et al. |
| 8,896,430 B2 | 11/2014 | Davidson et al. |
| 9,033,116 B2 | 5/2015 | Breed |
| 9,046,376 B2 | 6/2015 | Tuukkanen |
| 9,102,335 B2 | 8/2015 | Mueller |
| 9,157,752 B1 | 10/2015 | Fernández Garcia et al. |
| 9,218,316 B2 | 12/2015 | Bernstein et al. |
| 9,523,984 B1 * | 12/2016 | Herbach ............... B62D 15/025 |
| 2006/0271251 A1 | 11/2006 | Hopkins |
| 2008/0091309 A1 * | 4/2008 | Walker .................... B60R 25/02 701/1 |
| 2008/0180523 A1 | 7/2008 | Stratton et al. |
| 2011/0251752 A1 | 10/2011 | Delarocheliere et al. |
| 2014/0136414 A1 | 5/2014 | Abhyanker |
| 2015/0006005 A1 | 1/2015 | Yu et al. |
| 2015/0317597 A1 | 11/2015 | Shucker et al. |
| 2017/0297565 A1 * | 10/2017 | Joyce .................... B60W 10/04 |

FOREIGN PATENT DOCUMENTS

| | | | |
|---|---|---|---|
| WO | WO 2014148976 A1 * | 9/2014 | ............ B60W 30/00 |
| WO | WO 2015/034744 A1 | 3/2015 | |
| WO | WO 2015/057741 A1 | 4/2015 | |
| WO | WO 2015/153697 A1 | 10/2015 | |

* cited by examiner

EMERGENCY STOPPING FOR AUTONOMOUS COMMERCIAL VEHICLES

BACKGROUND

The present disclosure generally relates to autonomous commercial vehicles.

Although research is underway to develop autonomous vehicles, much of the research has been directed toward autonomous passenger vehicles. Passenger vehicles, however, share the roads and highways with commercial vehicles that transport goods. Commercial vehicles include, for example, trucks and tractor-trailers, which primarily operate on highways and other high-grade roads.

Commercial vehicles, in particular, tractor-trailers, differ from passenger vehicles not only in size, but also in mechanical operation, as well as typical uses. Commercial vehicles, often referred to by people outside of the industry as "trucks," are often described and envisioned as functioning the same as a passenger car. That mindset may be due to the fact that a "pick-up" truck is classified as approximately the same as a passenger car in terms of licensing and regulatory affairs and the word "truck" is applied to both commercial vehicles and "pick-up" trucks with casual abandon. While it is true that a passenger car and commercial vehicle both, in fact, perform the same function, i.e. the both carry freight from one location to another. The "freight" in a passenger car is human freight while in a commercial vehicle it is material cargo. The similarity at that junction ends. Passenger vehicles (and "pick-up" trucks) are responsible for the relatively short range delivery of the driver (and sometimes a few passengers) from one location to another with little to no advance warning, planning, or logistics involved.

Commercial vehicles, on the other hand, are commissioned (i.e., paid) to deliver tens of thousands of pounds of cargo from one location to another with demanding schedules, narrow windows for pickup and delivery, regulatory limits on the drive time, and conflicting priorities. An autonomous commercial vehicle lacks a full-time human driver, who would typically accomplish these tasks.

In view of the foregoing, there is a need for improvements to autonomous commercial vehicles.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for controlling a commercial highway vehicle. The method includes detecting a failure of a first component based on a first signal from a first sensor. The method also includes classifying, by an automated driving system on the vehicle, a severity of the component failure. The method further includes determining to stop the vehicle, by the automated driving system on the vehicle, if the severity exceeds a threshold severity level. The method also includes determining an emergency stopping distance, by the automated driving system on the vehicle, based on the severity and a current momentum of the vehicle. The method further includes determining, by the automated driving system on the vehicle, a stopping location within the emergency stopping distance. The method also includes stopping the vehicle, by the automated driving system on the vehicle, at the stopping location.

In another aspect, the disclosure provides an autonomous commercial highway vehicle. The autonomous commercial highway vehicle includes a plurality of sensors that each monitor a respective component of the vehicle. The autonomous commercial highway vehicle also includes a data bus that carries signals reported from the plurality of sensors. The autonomous commercial highway vehicle further includes a memory and a processor communicatively coupled to the data bus and the memory. The processor is configured to detect a failure of a first component based on a first signal from a first sensor of the plurality of sensors. The processor is further configured to classify a severity of the component failure. The processor is also configured to determine to stop the vehicle if the severity exceeds a threshold severity level. The processor is further configured to determine an emergency stopping distance based on the severity and a current momentum of the vehicle. The processor is also configured to determine a stopping location within the emergency stopping distance. The processor is also configured to control one or more vehicle components to stop the vehicle at the stopping location.

These and other aspects of the invention will become more fully understood upon a review of the detailed description, which follows

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

One of the most important tasks a human driver performs in a commercial vehicle, e.g., a tractor-trailer, is to safely stop the commercial vehicle in the event of a problem. In the case of an obstruction in the path of a commercial vehicle, failure to safely stop the vehicle may result in a collision. The weight and momentum of a commercial vehicle may result in significant damage in the event of a collision. Even when the path of the vehicle is not obstructed, various events may result in a need to stop the commercial vehicle. The commercial vehicle must not only stop safely, but should also be able to clear the roadway and/or resume navigation along a route if possible.

On the other hand, there is some risk involved in stopping a commercial vehicle. For example, due to the inertia of a moving commercial vehicle, stopping distances are greater than for smaller and lighter passenger vehicles. Moreover, for commercial vehicles such as tractor-trailers, an emergency stop may result in the tractor-trailer jackknifing at the joint between the tractor and the trailer. Among other problems, jackknifing may result in the trailer inadvertently entering an adjacent lane and causing damage to additional vehicles. Further, recovering a tractor-trailer from a jackknife position may require deployment of emergency equipment. In some cases, rather than making a dramatic stop, it may be more desirable for a commercial vehicle to maintain momentum and steer to a safe stopping location.

In an aspect, a commercial vehicle may determine whether an emergency stop is necessary based on a plurality of sensors. The commercial vehicle may detect an emergency situation such as the failure of a component based on a first sensor and confirm the emergency situation using a second sensor selected based on the detection by the first sensor. The commercial vehicle may rate the severity of the emergency and determine an appropriate stopping procedure for the specific emergency. For example, the commercial vehicle may determine whether the emergency situation is a critical failure that requires performing an emergency stop. In an aspect, an emergency stop may include immediately defueling the engine and/or shifting the transmission to neutral, thereby preventing driving force being applied through the drive wheels. In another aspect, the transmission may be shifted to a lower gear such that the engine resists movement of the vehicle.

Figure 1:
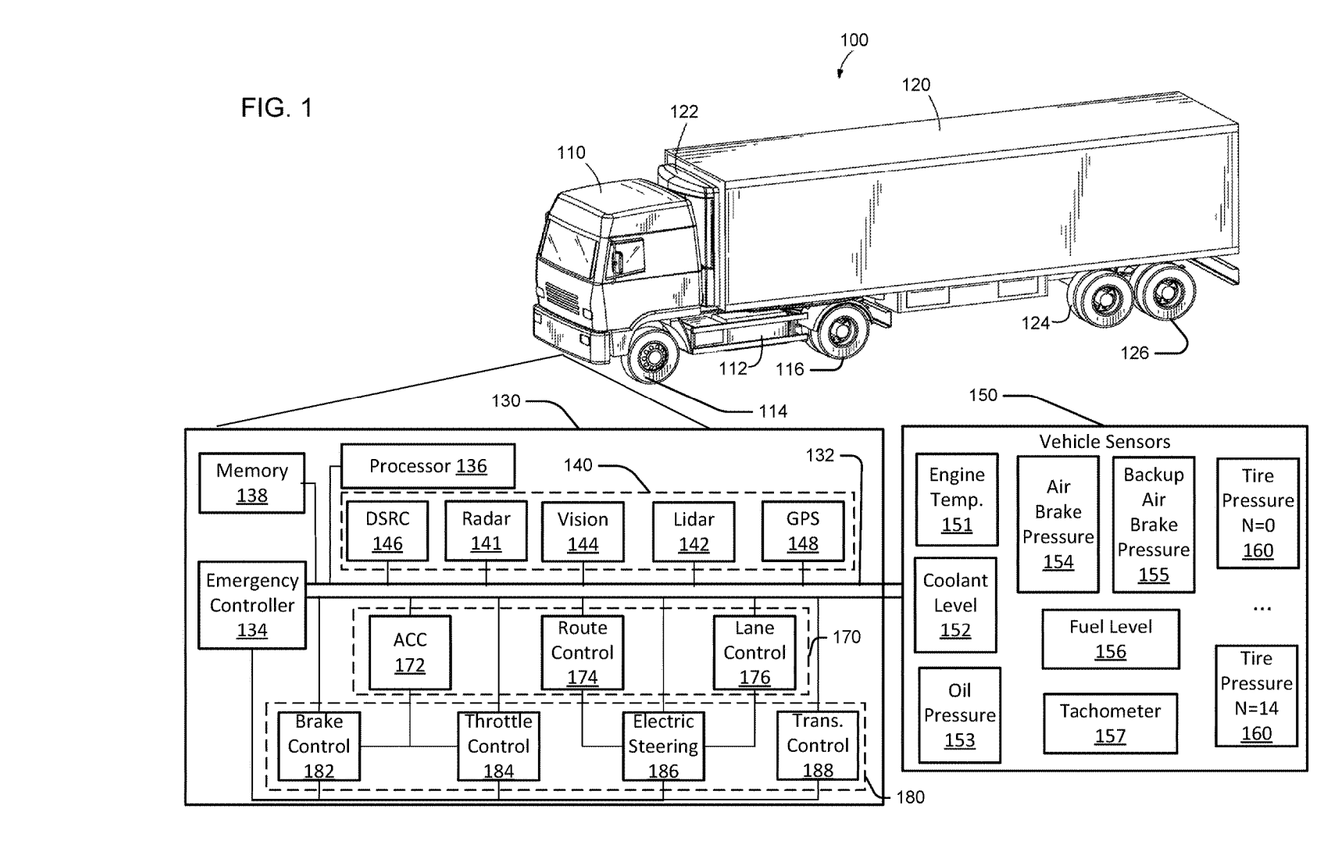
FIG. 1 is schematic diagram illustrating a commercial vehicle including an automated driving system.

FIG. 1 illustrates an example autonomous commercial vehicle 100 including an automated driving system 130. The autonomous commercial vehicle 100 includes a tractor 110 and a trailer 120. It should be appreciated that, in an aspect, the autonomous commercial vehicle 100 may be a truck that does not include separate tractor and trailer, in which case the components discussed below are located in corresponding portions of the truck, e.g., the tractor 110. The tractor 110 includes the driving components of the autonomous commercial vehicle 100. For example, the tractor 110 includes an engine, transmission, fuel tank 112, steer tires 114, and powered tires 116. The tractor 110 also includes the automated driving system 130, which may allow the tractor 110 to be operated autonomously (e.g., without input from a human driver) for at least some portions of time of operating the tractor 110.

The trailer 120 may be separated from the tractor 110. The trailer 120 generally includes a large cargo area for storing cargo supported by multiple sets of trailer wheels 124, 126. As illustrated the trailer 120 includes two sets of trailer wheels 124, 126 located at the rear of the trailer. In some embodiments, the trailer 120 is a wagon including one or more additional sets of front wheels. The cargo area may include a flat bed, container, or refrigerated container (reefer). The trailer 120 may include a refrigeration unit 122. The trailer 120 does not include its own driving system. Instead, the trailer 120 is hitched to the tractor 110 and pulled by the tractor 110. The trailer 120, however, may include various features that assist with driving and may be controlled by the automated driving system 130. The tractor 110 may be operated with different trailers, so these features may be optional. For example, the trailer 120 may include a braking system such as an air brake system that brakes the trailer wheels 126. Sensors may be attached to each of the trailer wheels 126 and/or the associated braking system to provide a status of each of the trailer wheels 126. The trailer 120 may also include sensors such as rear facing radar, lidar, or cameras. Further, the trailer 120 may be connected to a data bus of the tractor 110 such that any of the components or sensors of the trailer 120 may provide data to the tractor 110 and the automated driving system 130.

The automated driving system 130 includes a plurality of sensors and controllers under the control of one or more processors 136 via instructions and/or corresponding data stored in a memory 138. For example, an emergency controller 134 may be implemented by the processor 136 and memory 138 and may control other components of the automated driving system 130. The automated driving system 130 generally replaces the driver of the tractor 110, but may also allow manual override and control of the tractor 110. As used herein, the term "driverless" refers to a state in which the automated driving system 130 controls the autonomous commercial vehicle 100 without input from a human driver. According to the present aspects, the automated driving system 130 may be conceptually divided into input systems 140, decision systems 170, and control systems 180. The input systems 140 can include, but are not limited to, radar system 141, lidar system 142, vision system 144, Dedicated Short Range Communication System (DSRC) 146, global positioning system (GPS) 148, as well as vehicle sensors 150. Decision systems 170 generally determine how the autonomous commercial vehicle 100 should respond to the input systems. The decision systems 170 include an adaptive cruise control (ACC) system 172, route control system 174, and lane control system 176. The control systems 180 translate decisions of the control systems into controls of the autonomous commercial vehicle 100. For example, the control systems 180 include brake control system 182, throttle control system 184, electronic steering system 186, and transmission control system 188. The various components of the automated driving system 130 may be coupled via a data bus 132.

The automated driving system 130 may also include an emergency controller 134. The emergency controller 134 may be implemented by the processor 136 and the memory 138 or may include a separate processor and memory storing executable instructions for detecting and responding to emergency situations. The emergency controller 134 may be coupled to the data bus 132 and receive any signals generated by the vehicle sensors 150 via the data bus 132. In another aspect, one or more of the vehicle sensors 150 may be connected to the emergency controller 134. For example, the emergency controller 134 may include input ports for receiving a connection to one or more of the vehicle sensors 150. The emergency controller 134 may also receive input from the input sources. In an aspect, the emergency controller 134 may bypass decision systems 170 such as the ACC system 172, route control system 174, and lane control system 176 and directly control the control systems to control the autonomous commercial vehicle 100. In an aspect, the emergency controller 134 may detect a component failure, classify the severity of the component failure, and perform an emergency stop when the component failure is a critical component failure. After an emergency stop, the emergency controller 134 may provide information to a fleet manager regarding the status of the autonomous commercial vehicle and the reasons for the emergency stop. The emergency controller 134 may further perform an evaluation of the autonomous commercial vehicle 100 to determine whether the vehicle can be moved. In an aspect, the emergency controller 134 may operate the autonomous commercial vehicle 100 in a creep mode with one or more component failures. The creep mode may allow for a remote operator (e.g., a fleet manager) to assume manual remote control of the autonomous commercial vehicle 100.

Electronic Braking or electric brake control system 182 is used to automatically stop or slow down the autonomous commercial vehicle 100 should one of the forward looking sensors (radar system 141, vision system 144, lidar system 142) detect an object in the path of the autonomous commercial vehicle 100. The term electronic braking or electric brake control refers to the fact that the brakes are controlled via an electronic system. The braking system itself may be a traditional air brake system that automatically brakes if air pressure is not applied to keep the brakes closed. Further, the air braking system may incorporate an anti-lock braking system that controls the air pressure to the brakes to prevent the brakes from locking during a sudden stop. In addition, the braking commands from vehicles in front of the autonomous commercial vehicle 100 may be received via the DSRC 146, and their braking rate may trigger electronic brake control 182 to initiate a braking event as well. Suitable examples of electric brake control 182 system may include, but are not limited to, electric braking control systems manufactured by Bendix and Meritor Wabco.

Adaptive Cruise Control (ACC) 170 uses one of the forward looking sensors (e.g., radar system 141, but could use vision system 144 or lidar system 142) to gauge the distance to the vehicle in front of the autonomous commercial vehicle 100 and maintain a constant distance. Suitable examples of ACC system 172 may include, but are not limited to, ACC systems manufactured by Bendix, Meritor Wabco, and Mobileye.

Lane Departure Warning or the lane control system 176 uses a vision system to "see" (e.g., to identify within a graphics image) the strips or other markings on the road and notify the driver when the vehicle is crossing over the lane. The system is also used in some embodiments as a lane keeping device to assist in keeping the vehicle in the designated lane. Suitable examples of lane control systems 176 may include, but are not limited to, lane departure warning systems manufactured by Mobileye, Iteris, Continental, Denso, and Bosch.

Electronic Steering 186 or active steering enables the steering mechanism of autonomous commercial vehicle 100 to be controlled through electronic means. Most applications simply add a stepper motor to the existing steering control gear box. An example of such a system is an electronic steering system manufactured by TRW. In a partially driverless vehicle, the steering wheel may be engaged or disengaged. For example, the steering wheel may be engaged in a manual override mode. In a fully driverless vehicle, the stepper motor may completely replace the steering control arm and gearbox. The electronic steering system 186 may be manually controlled via wired or wireless access to the automated driving system 130. In another aspect, the electronic steering 186 may be implemented using hydraulic control via a power steering system. An electronically controlled proportioning valve may be added to the power steering system. The electronic steering system 186 may control, via the proportioning valve, the proportion of power steering fluid applied in each steering direction thereby steering the vehicle.

Throttle control system 184 is a direct control of the engine speed. In a conventional vehicle, the throttle may be electronically controlled though a pulse width modulated signal from the throttle pedal. In the autonomous commercial vehicle 100, the throttle signal may be directly controlled by the automated driving system 130 based on decision systems 170 such as ACC system 172. Throttle control signals may be specific to an original equipment manufacturer (OEM) of the engine and throttle control system 184 may be configured to provide the appropriate throttle signal.

Radar system 141 is used to detect and measure objects in the forward path of the vehicle. Radar systems use microwave energy at various frequencies (e.g. 24.5 and 77 GHz are common). Radar systems are capable of accurately measuring distance and closing velocity. Radar system 141 may have the capability of tracking multiple targets simultaneously. Suitable examples of a radar system 141 may include, but are not limited to, lane departure warning systems manufactured by Bendix, Wabco, Denso, Continental, and Bosch. Radar systems are very accurate, but cannot accurately detect relatively static (still) objects. To overcome that limitation, the radar system 141 may be coupled with the vision system 144. The combined system may combine the radar data and vision data to provide a complete picture (landscape) of what is in front of the vehicle.

Lidar system 142 is an imaging or measuring system that functions approximately the same as radar, but uses a laser as the active element. These systems are typically used in specialty markets (e.g. law enforcement and aircraft altimeters) for determining distance or speed. Lidar is also used extensively in research and development. In a commercial vehicle, the lidar system 142 may be used as a supplement or alternative to the radar system 141. The Lidar system 142 may provide more accurate measurements of distance and may provide better detection of stationary objects.

Vision system 144 provides forward, side and/or rear detection systems that use image processing algorithms to detect, classify, and measure various shapes and forms in images obtained from various cameras. The cameras may face in different directions. In an aspect, the cameras are paired to provide different points of view in the same direction. The vision system 144 is also used to read speed limit signs, warning signs, and other text based signage using optical character recognition. Suitable examples of a vision system 144 may include, but are not limited to, vision systems manufactured by Bendix, Mobileye, Continental, Bosch.

Dedicated Short Range Communication System (DSRC) 146 is a special spectrum of the 5.9 GHz band that was set aside by the FCC specifically for vehicular use. This effort was initially a part of the Intelligent Transportation system. The use of the DSRC system is critical to the communication between driverless vehicles. This system will provide emergency braking information from car to car, provide lane change warnings, and be used to pass any information needed from one vehicle to another. It may be used, in combination with the GPS information from each vehicle, to "map" the vehicles in the adjacent vicinities. In addition, it may be used to provide information from the infrastructure to the vehicle such as warnings, notices, and navigation information. Stop signs, red lights, green lights, curves, work zones and the like may all be transmitted electronically to adjacent vehicles. Suitable examples of a DSRC 146 may include, but are not limited to, DSRC systems manufactured by Denso and Continental.

Global Positioning System (GPS) 148 uses a series of satellites that broadcast continuous time information. Using an algorithm that converts the time of arrival from several satellites to positional information, a receiver may determine the location anywhere on the globe. The GPS 148 may include any satellite based location system or global navigation satellite system (GNSS) such as GLONASS, BeiDou, Compass, Galileo, or IRNSS.

The vehicle sensors 150 may include any sensors associated with the operation of autonomous commercial vehicle 100 including both sensors for tractor 110 and sensors for trailer 120. The vehicle sensors 150 may include sensors available on conventional vehicles. In a conventional vehicle, the sensor information is often provided via a data bus 132 (e.g., a J1939 bus) to a dashboard display. A conventional vehicle may also include alarms or an enunciator that is triggered when sensors produce certain values. In the autonomous commercial vehicle 100 operating at least in the driverless state, the sensor information may be provided to automated driving system 130. The automated driving system 130 may detect vehicle component failures based on one or more of the vehicle sensors 150. The automated driving system 130 may monitor the current value of each of the vehicle sensors 150 and also track the values over time to determine instantaneous and longer rates of change.

The vehicle sensors 150 may include, but are not limited to, an engine temperature sensor 151, a coolant level sensor 152, an oil pressure sensor 153, an air brake pressure sensor 154, a backup air brake pressure sensor 155, a fuel level sensor 156, a tachometer 157, and a tire pressure sensor 160 corresponding to each tire. As illustrated, the autonomous commercial vehicle 100 includes fourteen (14) tires, but it should be appreciated that a commercial vehicle may include any number of tires (N). For example, many commercial vehicles include eighteen (18) tires or more and may include a corresponding number of tire pressure sensors 160.

Figure 2:
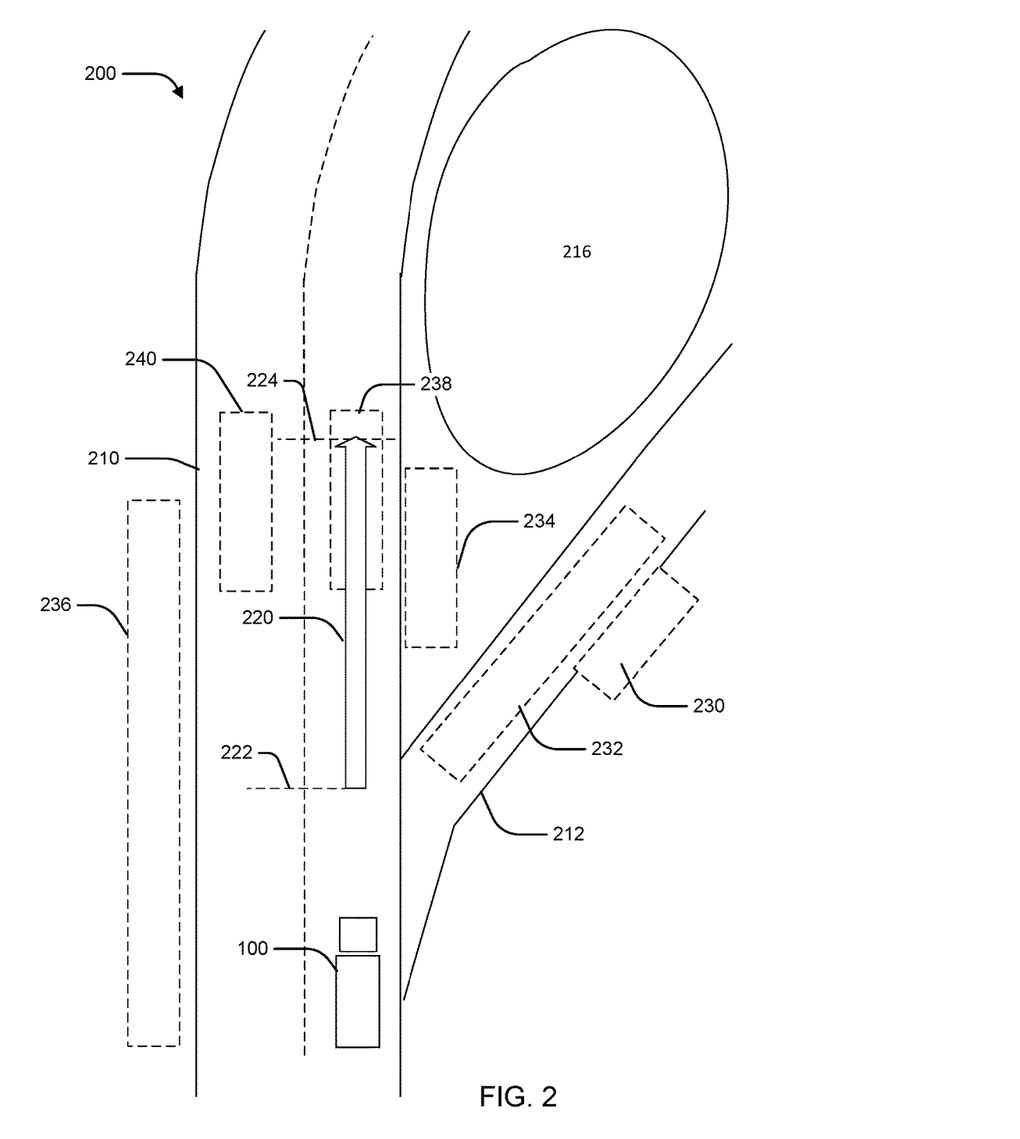
FIG. 2 is a schematic diagram illustrating potential emergency stopping locations.

FIG. 2 illustrates a diagram showing emergency stopping locations for an autonomous commercial vehicle 100. The autonomous commercial vehicle 100 may determine an emergency stopping range 220 in response to determining a failure of a vehicle component. The emergency stopping range 220 may have a minimum stopping distance 222 based on, for example, a current speed of the vehicle, a current load of the vehicle, any impairments to the braking system, weather conditions, and/or road conditions (e.g., grade). For example, the minimum stopping distance 222 may be calculated assuming that the autonomous commercial vehicle 100 performs all actions for stopping as fast as possible without any coasting. The emergency stopping range 220 may have a maximum distance based on current conditions and an assumption that the engine is immediately defueled in response to detecting the failure of the vehicle component. In an aspect, the maximum distance 224 may be based on a coasting distance of the autonomous commercial vehicle 100 when no further engine power is supplied to the drive wheels. For example, the coasting distance may be based on the vehicle speed, vehicle load, and road grade. The emergency controller 134 may estimate the coasting distance by determining a current momentum of the autonomous commercial vehicle 100 based on current speed and total weight, then estimate how far the momentum will carry the autonomous commercial vehicle along the current route based on the grade of the road. Component failures that do not require defueling the engine may be considered non-critical stops and may have a greater maximum distance 224 based on continued or limited operation of the engine.

The automated driving system 130 may select an emergency stopping distance within the emergency stopping range based on a severity of the component failure. For example, a highest severity stop condition (e.g., engine failure) may have an emergency stopping distance that is only slightly more than the minimum distance because, for example, only the braking force may adjusted to allow steering out of a travel lane. A lower severity stop condition (e.g., engine overheating) may have an emergency stopping distance up to the maximum distance 224. A non-critical stopping condition may have a maximum stopping distance based on the stopping condition or a vehicle component associated with the stopping condition.

In one implementation, the automated driving system 130 may prioritize emergency stopping locations based on a safety rating of the respective available stopping locations. The safety rating may indicate the safety of the vehicle remaining in the emergency stopping location after stopping. The automated driving system 130 may use GPS 148 and a map database to identify locations of potential emergency stopping locations. For example, in addition to providing travel lane information for a highway 210, the map database may indicate whether each shoulder of the highway is safe for stopping. The map database may further indicate off ramps 212 and hazards 216 (e.g., mountains or bodies of water). The automated driving system 130 may further use vision system 144 to determine whether current conditions (e.g., a parked vehicle) change the GPS based indication.

In an aspect, the various potential emergency stopping locations may be associated with respective safety rating. The emergency controller 134 may be configured to associate a safety rating to each potential emergency stopping location based on factors specific to the autonomous commercial vehicle 100. For example, the safety rating may be based at least in part on a type or value of a current cargo. The safety ratings may also be configurable such that a fleet operator may designate a higher priority for one or more classes of stopping locations. For example, highway shoulders may be preferred to exit ramps. In one example implementation, which should not be construed as limiting, the safest, and therefore highest priority stopping location may be a parking space 230 that is located on the shoulder of an off ramp 212. While other parking spaces may be available further off the highway 210, proceeding along local roads in an emergency may be dangerous. Further, in this example implementation, a second priority stopping location may be a right shoulder 234 (e.g., in the United States, where slower vehicles generally drive on the right; it could be a left shoulder in other countries, such as England). Also, in this example implementation, a third priority stopping location may be a left shoulder 236 (e.g., or in England, the right shoulder). Also, in this example implementation, a lower priority stopping location may be the travel lane 232 of the off ramp 212. Although the travel lane 232 may have moving traffic, such traffic should be at a lower speed than on the highway 210. Further, in this example implementation, a lower priority stopping location may be the travel lane 238. In the case that it is impossible for the autonomous commercial vehicle 100 to leave the highway 210 within the emergency stopping range 220, the furthest right travel lane may provide the least chance of a collision with a following vehicle. In this example implementation, a passing lane 240 may be the lowest priority stopping location to be used only when the autonomous commercial vehicle 100 cannot change lanes before stopping.

When an emergency stop is triggered based on the component failure detection techniques of the present disclosure, the automated driving system 130 may determine the emergency stopping range 220. The automated driving system 130 may then determine and rank all available stopping locations within the emergency stopping range 220. Then, for each potential stopping location, the automated driving system 130 may determine whether the potential stopping location is feasible based on current conditions and the severity of the component failure. For example, the automated driving system may determine whether the potential stopping location is currently occupied, and whether any neighboring vehicle are blocking a path to the potential stopping location. Additionally, the automated driving system 130 may determine whether any of the potential stopping locations are infeasible because the emergency stopping distance does not allow the autonomous commercial vehicle 100 to reach the stopping location due to the severity of the component failure. Based on this analysis, the automated driving system may then select the highest priority stopping location remaining within the emergency stopping distance for executing an emergency stopping protocol.

Figure 3:
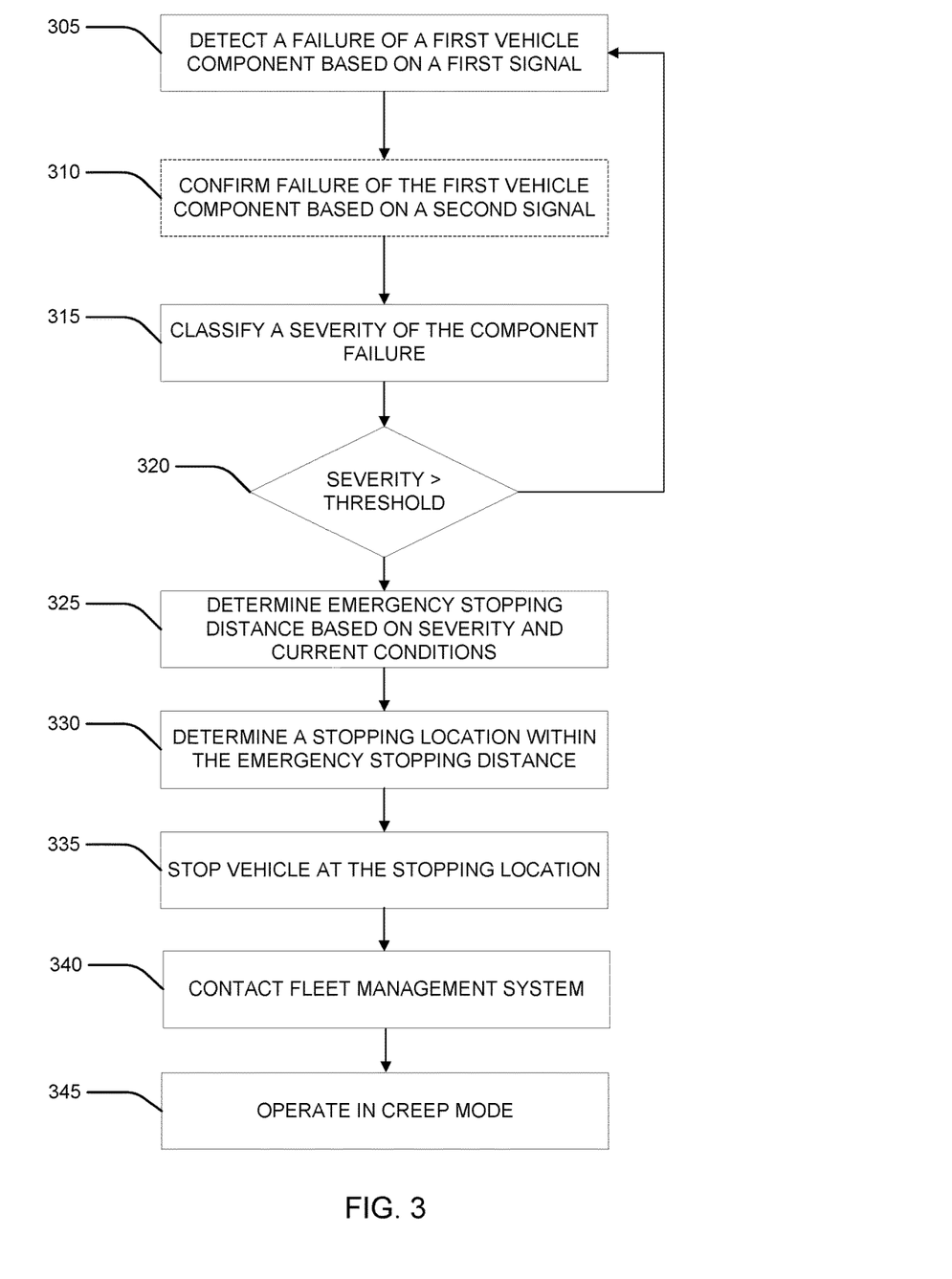
FIG. 3 is a flowchart illustrating a method of determining to stop a vehicle.

FIG. 3 illustrates a flowchart showing an example method 300 for determining an emergency stop for a driverless vehicle. The method 300 may be performed by various components of the automated driving system 130 including the emergency controller 134.

In block 305, the method 300 may include detecting a failure of a first vehicle component based on a first signal. In an aspect, for example, the emergency controller 134 may detect a failure of a first vehicle component (e.g., coolant level low) based on a signal provided by one or more of vehicle sensors 150 over data bus 132. The vehicle sensors 150 may generate a code indicating that a measured value has satisfied a threshold for triggering a warning. Generally, severe component failures are associated with a temperature exceeding a threshold value or a pressure falling below a threshold value. In another aspect, the vehicle sensors 150 may each provide measured values and the emergency controller 134 may compare the measured values to thresholds to determine whether a component failure has occurred.

In block 310, the method 300 may optionally include confirming failure of the first vehicle component based on a second signal. In an aspect, for example, the emergency controller 134 may confirm the failure of the first vehicle component based on a signal provided by a second one of the vehicle sensors 150. In an aspect, each type of warning condition detected by a primary sensor may be associated with a secondary sensor that can be used to confirm or deny the warning. Generally, the primary sensor and the secondary sensor do not measure the same condition. Instead, the emergency controller 134 makes an inference about an expected condition of the second sensor based on the first sensor condition, then checks to see if the inference is true. In an aspect, each warning condition may be associated with a set of inference rules for one or more secondary sensors. For example, a coolant level sensor 152 may be a secondary sensor associated with the high engine temperature condition and the engine temperature sensor 151. The emergency controller 134 may infer that the coolant level sensor 152 should be low, or experience a decrease, in association with the high engine temperature. Accordingly, the emergency controller 134 may confirm a high temperature detected by engine temperature sensor 151 by monitoring the coolant level sensor 152. As another example, an air brake pressure loss detected by air brake pressure sensor 154 or backup air brake pressure sensor 155 may be associated with one or more individual brake sensors or a speedometer to determine whether the brakes have been engaged due to low air brake pressure. That is, the emergency controller 134 may infer an expected engagement or temperature increase at an individual brake or a general decrease in speed to be associated with an air brake pressure loss. As another example, a low oil pressure condition detected by oil pressure sensor 153 may be associated with a tachometer. When the low oil pressure is signaled, the emergency controller 134 may infer that a pattern of reduced tachometer readings may correlate with the low oil pressure (e.g., due to increased friction). Low tire pressure conditions associated with the tire pressure sensors 160 may be associated with electronic steering system 186 and/or a level sensor (not shown). The emergency controller 134 may infer that the tractor 110 is expected to pull toward a side or the trailer 120 to tilt toward a side with low tire pressure. Additionally, a microphone or vibration sensor may confirm a flat tire. That is, the emergency controller 134 may infer that additional noise or vibration is expected in the case of a flat tire. In an aspect, if the vehicle component failure is not confirmed by a second sensor, the component failure may be treated as a non-emergency fault that should be inspected during a next service stop. In another aspect, some component failures may be determined critical failures that automatically initiate an emergency stop without confirmation. The confirmation may also be performed after the autonomous commercial vehicle 100 has completed the emergency stop.

In block 315, the method 300 may include classifying a severity of the component failure. In an aspect, the emergency controller 134 may classify the severity of the component failure. The severity may be a ranking (e.g., a number) or a classification (e.g., a category) of the risks associated with the detected component failure. The severity of the component failure may be based on the safety risk of continued operation with the failed component. Generally, the component failures are associated with failure codes transmitted on the data bus 132. The emergency controller 134 may include a mapping of failure codes to severity levels. The emergency controller 134 may use the mapping to look up the severity of a reported failure code. The failure codes may be OEM specific. In an aspect, the classification of the failure codes may be configurable at a fleet or vehicle level. For example, a fleet operator may increase the severity associated with cargo related failure codes for vehicles carrying fragile or dangerous cargo.

In block 320, the method 300 may include determining whether the severity satisfies a threshold. In an aspect, for example, the emergency controller 134 may determine whether the severity exceeds a threshold. The threshold may indicate a level of severity for which the autonomous commercial vehicle 100 should execute an emergency stop without attempting to drive farther. The component failures that satisfy the threshold may be considered critical failures, whereas component failures with a severity that do not satisfy the threshold may be considered non-critical failures. In an emergency stop triggered by a critical failure, the engine may be defueled and/or the transmission may be shifted to neutral, both of which prevent further driving force from being applied to the wheels. For example, some component failures such as high engine temperature, total loss of tire pressure, and loss of air brake pressure may necessitate stopping as soon as possible and may be considered critical failures. Other component failures, such as fuel level or coolant level failures, may need to be addressed but do not necessitate an emergency stop and may be considered non-critical failures. If the level of severity does not exceed the threshold, the method 300 may return to block 305. In an aspect, if multiple component failures are detected, the level of severity may be combined to produce a higher level of severity.

In block 325, the method 300 may include determining the emergency stopping distance based on the severity and current conditions. In an aspect, for example, the emergency controller 134 may determine the emergency stopping distance based on the severity and the current conditions as detected by the vehicle sensors 150 as well as one or more input components (e.g., radar, lidar, vision). As discussed above with respect to FIG. 2, the emergency stopping distance is within the emergency stopping range 220.

In block 330, the method 300 may include determining a stopping location within the emergency stopping distance. In an aspect, for example, the emergency controller 134 may determine the stopping location within the emergency stopping distance. As discussed above with respect to FIG. 2, determining the stopping location may include determining a prioritized list of potential stopping locations within the travel distance and determining the highest priority feasible stopping location.

In block 335, the method 300 may include stopping the autonomous commercial vehicle 100 at the stopping location. In an aspect, the emergency controller 134 may stop the autonomous commercial vehicle 100 at the stopping location by controlling the brake control system 182, throttle control system 184, and electric steering 186. Further details of stopping the vehicle are provided below with respect to FIG. 4.

In block 340, the method 300 may include contacting a fleet management system. In an aspect, the automated driving system 130 may contact a fleet management system. The automated driving system may provide a report regarding the emergency stop including the sensor readings that triggered the emergency stop and the procedures taken. The report may also include vehicle identification information such as a vehicle location, vehicle identifier, driver/passenger identifier, and cargo identifier. The automated driving system may also provide current vehicle capabilities such that the fleet management system may determine how to recover the autonomous commercial vehicle 100 and its cargo. The report may also be provided to law enforcement, an infrastructure management service, or a third party service. For example, law enforcement may be necessary to provide security to the disabled vehicle and direct traffic around the autonomous commercial vehicle 100. An infrastructure management service may provide warnings, via electric signs or DSRC infrastructure about the disabled vehicle. A third party service may provide assistance in moving the disabled vehicle. The reports may be provided via a vehicle communication system (e.g., satellite or cellular) or via the DSRC 146.

In block 345, the method 300 may include operating in a creep mode. A creep mode may refer to any state in which the autonomous commercial vehicle 100 is able to operate in a reduced capacity due to at least one component failure. The emergency controller 134 may determine whether the autonomous commercial vehicle 100 is capable of operating in a creep mode without damaging the autonomous commercial vehicle 100 or imposing a safety risk. In an aspect, the emergency controller 134 may perform an assessment of the autonomous commercial vehicle 100 including checking any available vehicle sensors 150. The emergency controller 134 may transfer control of the autonomous commercial vehicle 100 to a remote operator via the fleet management system for operation in the creep mode. In an aspect, the creep mode may be used to move the autonomous commercial vehicle 100 from a low priority stopping location to a higher priority stopping location. For example, the autonomous commercial vehicle may be moved from the passing lane 240 to the left shoulder 236.

Figure 4:
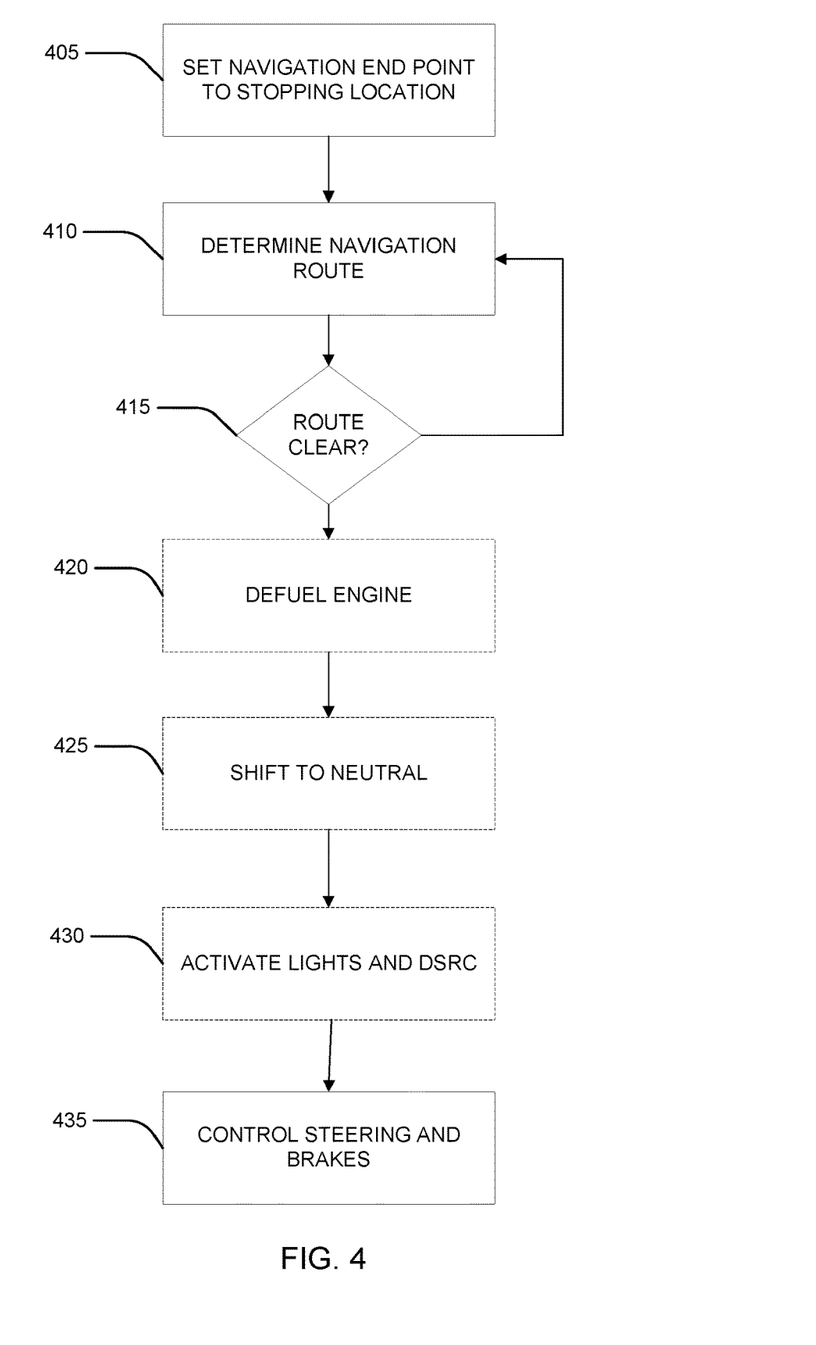
FIG. 4 is a flowchart illustrating a method of stopping a vehicle.

FIG. 4 illustrates a flowchart showing an example method 400 for stopping a driverless vehicle. The method 400 may be performed by various components of the automated driving system 130 including the emergency controller 134. In an aspect, the method 400 may correspond to block 335 of method 300.

In block 405, the method 400 may include setting a navigation end point to the stopping location. In an aspect, for example, the emergency controller 134 may set the navigation end point in the route control system 174 to the stopping location. In another aspect, the emergency controller 134 may bypass the route control system 174 and set the navigation end point for an internal routing process. In any case, the stopping location may be the emergency stopping location determined in block 330.

In block 410, the method 400 may include determining a navigation route. In an aspect, the route control system 174 may determine the navigation route. In another aspect the emergency controller 134 may determine the navigation route to the stopping location. The emergency controller 134 independently determine a route for an emergency stop, for example, using a most direct route available. The route may include lane changes including changing to an exit lane or changing to a shoulder, but generally does not include any turns onto another road. The emergency stopping route may be constrained a maximum steering angle or minimum turn radius. In an aspect, the emergency controller 134 may disable or bypass the lane control system 176 in order to allow the autonomous commercial vehicle 100 to travel outside of designated travel lanes. Because the emergency stopping route is generally fairly short, the input systems of the radar system 141, lidar system 142, vision system 144 may be used to determine the route. For example, the emergency stopping location may be converted from a GPS location into a location within the vision system 144. The vision system 144 may identify any obstacles (e.g., other vehicles) or other hazards (e.g., insufficient shoulder) on the direct path between the current location and the emergency stopping location. Radar system 141 and lidar system 142 may also be used to confirm obstacles or detect additional obstacles. The emergency controller 134 may then adjust the direct path to avoid any detected obstacles.

Additionally, determining the navigation route during an emergency stop may include determining a route that avoids neighboring vehicles. For example, if another vehicle is in a far right driving lane adjacent the autonomous commercial vehicle 100 and the stopping location is on the right shoulder, the navigation route may include slowing to a first speed to allow the vehicle in the right lane to pull ahead, then changing to the right lane, then slowing to a second speed, then changing to the shoulder, and finally coming to a complete stop.

In block 415, the method 400 may include determining whether the emergency stopping route is clear. The emergency controller 134 may repeatedly monitor input sources for signs that any object such as another vehicle has entered the navigation route. If the emergency controller 134 detects that the navigation route is no longer clear, the method 400 may return to block 420 for determining another navigation route. If the navigation route is no longer feasible, the method 400 may return to block 405 to set a different stopping location as the navigation end point.

In block 420, the method 400 may optionally include defueling the engine. In an aspect, the emergency controller 134 may control the throttle control system 184 to defuel the engine. The decision to defuel the engine may be based on the specific component failure detected. For example, component failures within the engine may indicate a need to defuel the engine whereas a failure of a brake or tire component may leave the engine running.

In block 425, the method 400 may optionally include shifting the transmission to neutral. In an aspect, the emergency controller 134 may control the transmission control system 188 to shift the transmission to neutral. The decision to shift to neutral may be based on the specific component failure detected. For example, component failures within the engine or transmission may indicate a need to shift to neutral to avoid causing further damage.

In block 430, the method 400 may optionally include activating emergency lights and the DSRC. In an aspect, for example, the emergency controller 134 may activate the emergency lights and control the DSRC 146 to transmit emergency stopping information. The emergency lights may include conventional vehicle emergency lights. The emergency lights may also include a text and/or audio warning of the impending stop. The DSRC 146 may transmit a braking signal as well as a lane change signal according to DSRC protocols. The DSRC 146 may also transmit a report regarding the disabled vehicle to DSRC infrastructure on the highway 210 (FIG. 2).

In block 435, the method 400 may include controlling the steering and brakes to perform the emergency stop. In an aspect, the emergency controller 134 may control the brake control system 182 and the electric steering 186 to perform the emergency stop. The emergency controller 134 may also control the throttle control system 184 and/or the transmission control system 188 if those components were not previously disabled.

The following examples further illustrate implementation of the methods 300 and 400 for performing an emergency stop in response to a component failure.

One possible critical failure in any internal combustion engine, whether it is diesel, gasoline, LNG, CNG, or propane, is a high engine temperature which may be caused by the loss of engine cooling. Loss of engine cooling causes the internal cooling system of the engine to fail thus causing the internal temperatures of the engine to rise past the normal recommended operating point, which can lead to severe and expensive damage.

Vehicle sensors 150 may indicate a high engine temperature as "Low Coolant Level" or "Engine Temp." Many conventional vehicles will illuminate a warning light on the dash or provide an actual gauge showing the coolant level. A driver of a conventional commercial vehicle will typically pull the vehicle over to the side of the road and not try to make it to the next stop or service facility when this service light appears on the dash.

An autonomous commercial vehicle 100 may be configured to determine what actions to take in the event of a loss of engine cooling. While a warning for low coolant level from coolant level sensor 152 may signal a component failure, there are other causes that may initiate the warning without being a critical failure causing harm to the vehicle such as a defective sensor, loose connector, or broken wire. Since the coolant level sensor 152 is independent of the high signal from the engine temperature sensor 151, a driverless vehicle may be able to diagnose whether warnings generated by either level indicate a critical failure or minor problem. In one example, the automated driving system 130 may monitor the coolant level sensor 152 as a primary sensor and detect that the sensor indicates a value that satisfies a threshold thereby indicating a warning condition. The automated driving system 130 may also monitor the engine temperature sensor 151 as a secondary sensor. In the event that the Low Coolant Level warning was active, but the engine temperature sensor 151 is operating in the normal zone, the automated driving system 130 may continue to operate the autonomous commercial vehicle 100 in a normal mode. The automated driving system 130 may signal to a fleet manager of the low coolant level. The fleet manager may provide instructions (if any) on what actions to take; such as continuing the route to the destination, route to a service facility, or any number of other options that would be available to the fleet manager. Accordingly the automated driving system 130 may allow for remote or local human management of varying degree based on the warning.

However, if the emergency controller 134 detected a low coolant level warning based on the primary sensor and then monitored a correlated rise in the engine temperature sensor 151 on the secondary sensor, a response protocol may be initiated based on the excessive temperature. In the event of an engine temp event (e.g., engine temperature sensor 151 exceeding a threshold value), the actual engine temperature will be broadcast on the J1939 data bus 132. The automated driving system 130 would have the opportunity to monitor this data over a period of time. In the event that a spike, or anomalous data occurred, the automated driving system 130 may determine that in fact, a false signal had triggered the engine temp fault. However in the event that the data was consistent and above the temperature threshold for the engine, as recommended by the engine manufacturer, the automated driving system 130 may operate the autonomous commercial vehicle 100 to perform an emergency stop protocol.

The emergency stop protocol for an Engine Temp fault may typically include stopping the autonomous commercial vehicle. However, for a commercial vehicle operating on a major freeway or interstate highway, stopping the engine immediately is not always possible. Depending upon the roadway, the amount of traffic, the time of day, and even ancillary conditions like weather, the autonomous commercial vehicle 100 may not safely pull over and stop.

The automated driving system 130 may have a limited number of options available before excess engine temperature causes catastrophic damage to the engine. The emergency stopping protocol for an Engine Temp fault may include defueling the engine to slow it down and reduce the amount of heat buildup (e.g., in block 420). The protocol may also include initiating emergency flashers and notify adjacent vehicles with emergency warning messages (e.g., via the DSRC) (e.g., in block 430). In order to provide maximum cooling, the automated driving system 130 may also verify that the engine fan is on; and if it is not, send a command to turn the fan on. To conserve momentum, the automated driving system 130 may shift the transmission into neutral (e.g., in block 425). The protocol may also include notifying the vehicle's back office or fleet management system and provide details of the diagnosed and measured failure(s).

During or after the defueling of the engine and the associated loss of power, the coolant system may be able to provide sufficient thermal capacity to control the engine temperature with lower power generation to enable a creep mode. A creep mode may refer to a state in which the autonomous commercial vehicle 100 may operate in a reduced capacity with one or more malfunctioning components. If the coolant temperature stabilizes and does not increase or rise past the existing point, the vehicle can then continue to operate at that reduced power level. For example, the emergency controller 134 may move the autonomous commercial vehicle 100 to a more "safe" location such as off road parking using the creep mode.

As another example of a potential component failure, the loss of the engine oil pressure as detected by oil pressure sensor 153 typically indicates that an insufficient quantity of oil is available to lubricate the engine. Although a relatively rare occurrence, this event may be considered to be at least as if not more critical than the engine temperature as described above. In the event of a loss of oil pressure, the actual oil pressure will be broadcast on the J1939 data bus 132. The emergency controller 134 would have the opportunity to monitor this data over a period of time. Unfortunately, most oil pressure events are caused by a component failure, such as failure of the oil pump, a gasket failure, or a gear failure and occur without previous indication or warning. Therefore, there is no data available to indicate an impending failure. In an aspect, the emergency controller 134 may assume that the indicated loss of oil pressure as indicated by a primary sensor is real and react accordingly without confirming via a secondary sensor. In another aspect, the tachometer 157 may be used as a secondary sensor to determine whether under current conditions the engine is experiencing decreased performance (e.g., due to excess friction). A rise in engine temperature indicated by the engine temperature sensor 151 may also correlate to a loss of oil pressure.

The emergency stopping process for a Loss of Oil Pressure is typically to stop the engine as soon as possible. The emergency stopping process may include defueling the engine in block 420. The emergency stopping process may also include removing the load from the engine by shifting the transmission into neutral in block 425. Due to the extreme emergency and potential damage to the engine, the emergency stopping distance within the emergency stopping range 220 in the event of a loss of oil pressure may be relatively short. The most viable option for a stopping location may be the side of the road unless an exit ramp is within the coasting distance of the vehicle.

Another example of a component failure is a signal that the air brake pressure sensor 154 or backup air brake pressure sensor 155 indicates low pressure. Government regulations require that heavy duty commercial vehicles be equipped with air brake systems. These air brake system operate by applying the brake when the air pressure is removed thus providing fail safe operation. However, if the air system is defective or if the air source fails, the brakes will automatically engage thus stopping the vehicle. If the failure is due to a slow leak, the air compressor will cycle continuously; the brakes may glaze due to the friction with the drum, and the wheels could potentially overheat and catch fire. The air system on a truck is considered to be a safety critical system and the federal government requires that the braking system be supplied by a primary air supply but that a backup or secondary air supply also be available in the event that the primary system fails. The air brake pressure sensor 154 may detect the air pressure on the primary system and the backup air brake pressure sensor 155 may detect the pressure of the backup system as required by federal law.

The air pressure data is continuously provided to the emergency controller 134. The air pressure data is also distributed on the J1939 bus 132. In the event that the emergency controller 134 detects a sudden drop in the air pressure, the emergency controller 134 must decide what action to take very quickly as the brakes will begin to automatically deploy. Accordingly, in an aspect, block 310 may be skipped if the component failure is related to the brakes. That is, a signal from either the air brake pressure sensor 154 or the backup air brake pressure sensor 155 may be automatically treated as a critical component failure. In the event of an air pressure failure, the failsafe brakes may automatically deploy to stop the vehicle. Once again, the emergency stopping distance within the emergency stopping range 220 may be relatively short due to the automatic deployment of the brakes. There may be no need to perform blocks 420 and 425 in the event of an air pressure loss. The most viable option for a stopping location may be the side of the road unless an exit ramp is within the coasting distance of the vehicle. The method 400 may proceed to block 430 and immediately activate the emergency lights and DSRC to warn of the impending stop.

In a variation of method 400, in block 435, the emergency controller 134 may control the throttle control system 184 to rev the engine to the maximum allowed RPM and control the transmission control system 188 to shift the transmission into neutral. By accomplishing this, the air compressor may be able to generate additional pressure to prevent the brakes from self-applying. After the vehicle has safely pulled to the side of the road, the engine may be defueled and shut down.

A related component failure is a failure of an antilock braking system (ABS). The ABS may be a self-contained system including its own controller. The ABS system may provide signals indicating when a component failure has occurred. Generally, failure warnings from the ABS system may be considered non-critical because the air braking system will still operate. However, in certain conditions (e.g., wet or icy roads), the severity of the ABS failure may be increased. For example, an ABS failure on an icy road may trigger an immediate stop with a long maximum distance 224.

Another example of a potential component failure is an out of fuel warning. A driverless vehicle should be expected to have a sufficient quantity of fuel to arrive at the intended destination. Unexpected variances in the route could deplete the fuel and cause the vehicle to run out of fuel. Some of these causes could be an improperly filled tank at departure, theft of fuel, routing conditions that slow the vehicle and cause it to consume larger than anticipated amounts of fuel, leaks in the fuel system, or mechanical failures in the fuel delivery system. In the event that a vehicle begins to run low on fuel, the automated driving system 130 should be able to predict that the vehicle will be unable to reach the intended destination. Accordingly, the out of fuel condition may be a low severity condition that may not trigger an emergency stop unless the fuel level reaches a point that causes the engine to stall. Preferably, the automated driving system 130 may use the route control system 174 to route the autonomous commercial vehicle 100 to the nearest fueling station. If a fueling station is not within range, the automated driving system 130 may route the autonomous commercial vehicle 100 off the highway or interstate highway and locate a predetermined location to park and wait for human assistance. Human assistance could be a representative or employee of the fleet management company, a local service company such as AAA or Stewart & Stevenson, or a local service company representative of a towing agency.

In the event that the vehicle suddenly loses a fuel supply such as caused by a mechanical failure in the fuel pump, fuel delivery system, or mechanical damage to the vehicle, the engine would cease to function and the emergency controller 134 may perform the methods 300 and 400. The method 400 may include block 425 to shift the transmission to neutral. The block 420 may be moot because the component failure defuels the engine.

Another potential component failure may include a sudden engine failure. In the event of a sudden engine failure which may be caused by any number of unexpected events, the engine will cease operating. The oil pressure will drop to zero, and the RPM will also drop to zero. The emergency controller 134 may, for example, use the oil pressure sensor 153 as the primary sensor and the tachometer 157 as the secondary sensor to confirm the engine failure. Other parameters, communicated on the data bus could equally signify a failure in the engine and be used as secondary sensors.

The autonomous commercial vehicle 100 will have a very limited number of options available since catastrophic damage has caused the engine to cease operation. The emergency controller 134 may perform the methods 300 and 400. The method 400 may include block 425 to shift the transmission to neutral. The block 420 may be moot because the component failure defuels the engine. The most viable option for a stopping location may be the side of the road unless an exit ramp is within the coasting distance of the vehicle. After a predetermined period of time, for example 30 seconds after stopping, the automated driving system 130 may initiate a self-start sequence to determine if the engine can be started.

Another potential component failure is a tire failure or blowout. Directional stability is provided primarily through the tires on the vehicle. As such, the proper functioning of the tires and associated suspension system are considered to be safety critical. Tires have proven to be extremely reliable often achieving well over 120,000 miles on a commercial vehicle. However, failure of a single tire can present an extremely dangerous situation. The most critical tires on the commercial vehicle are the steer tires 114, the two tires in the front of the vehicle that actually provide the directional control. Without both of the steer tires 114 operating correctly, vehicle stability is severely compromised. The remainder of the tires, whether on the drive axles, load axles, or trailer axles are critical for load carrying capacity, but do not present the challenges that the steer tires present.

The tires are monitored with tire pressure and tire temperature monitoring devices that provide periodic tire pressures and temperatures for each tire to the automated driving system 130 via the J1939 data bus 132. In normal operation, when the tire pressure is relatively constant, the tire pressure and temperature is transmitted at large intervals, typically once every 5 minutes, however, when the sensor detects a sudden change in the tire pressure or temperature, the data will be immediately transmitted to the automated driving system 130.

Without proper air pressure, the internal components of the tire—fabric, steel, rubber, and composites—flex beyond their designed limits. Without proper air pressure, the tire's internal pieces will over flex, weaken, and, eventually, fail. When an incremental change in tire pressure or temperature is detected, the emergency controller 134 will note whether the pressure or temperature change is due to an over inflation (caused by frictional heating of the tire during normal operation) or from under inflation.

Incremental under inflation is not a time critical event, but left unattended can lead to serious tire damage or a catastrophic tire failure (blow out). In the event of a monitored and continued deflation of the tire, necessary precautionary actions must be taken to prevent a catastrophic failure. As the monitoring system continues to measure a decrease in the tire pressure, the tire temperature is also monitored. A continued or continuous decrease in pressure is indicative of impending tire failure. An associated rise in the tire pressure provides a secondary indication of potential tire failure.

The emergency controller 134 may determine that a tire is continually losing pressure by monitoring a primary sensor such as the tire pressure sensor 160 associated with the tire. A tire temperature sensor may be used as a secondary sensor to measure an associated increase in temperature. The automated driving system 130 may predict that the vehicle will be unable to reach the intended destination before a critical tire failure. The automated driving system 130 may reroute the vehicle to the nearest service location. These locations may be a truck dealership, a tire service center, a commercial service center such as Stewart & Stevenson, or a simple commercial service station. In an aspect, the automated driving system 130 may control the throttle control system 184 to allow the road speed to reduce to the lowest legal or recommended speed for that particular roadway or interstate. The automated driving system 130 may also notify adjacent vehicles with emergency warning messages via the DSRC 146. In another aspect, the automated driving system 130 may route the vehicle off the highway and select a location to park and wait for human assistance. Human assistance could be a representative or employee of the fleet management company, a local service company such as AAA or Stewart & Stevenson, or a local service company representative of a towing agency.

In the event that the emergency controller 134 determines that a tire exhibited an extreme loss of pressure (e.g., the tire pressure sensor 160 goes to zero), exemplified by a blowout, the emergency controller 134 may perform the methods 300 and 400. In block 310, the loss of pressure may be confirmed by a correlated change in electric steering 186 or a change in the balance of trailer 120. In block 315, the emergency controller 134 determine which tire is involved. If the emergency controller 134 determines that a drive axle tire, a load axle tire, or a trailer tire is involved, the emergency controller 134 may determine that a non-critical component failure has occurred. The emergency controller 134 may control throttle control system 184 to defuel the engine in a safe manner to slow the forward velocity to a significantly lower speed that is still safe and legal for the roadway or interstate. If the emergency controller 134 determines that a steer tire 114 is involved, the emergency controller 134 may determine that a critical component failure has occurred. The emergency controller 134 should, in block 410, immediately defuel the engine to slow the forward velocity to a significantly lower speed that is still safe and legal for the roadway or interstate. Since the ability of the vehicle to provide lateral control ("steer") is severely compromised with the loss of a steer axle tire, the emergency controller 134 should select a stopping location on the side of the roadway. If the vehicle is able to function in a creep mode after stopping, then the vehicle may be rerouted to a suitable off-road parking location using the creep mode.

Other component failures or warnings may be classified as non-emergency faults or secondary vehicle failures. A large number of diagnostic faults may be recorded on the vehicle and transmitted to the back office or fleet manager. The nature of each of these faults may or may not be critical to the operation of the vehicle. These secondary faults most often are an indication of a more serious problem within the vehicle. However, without other warnings notifications or diagnostic codes, the vehicle can typically continue to operate. These secondary codes are listed in the following table.

Engine Oil Temperature (high)
Transmission Oil temperature (high)
Transmission Oil level (low)
Low Fuel Pressure
Loss of Sensor
Engine Oil Pressure (high)
Engine Coolant Temperature (low)

Engine Coolant Level (high)
Fuel Delivery Pressure (high)
Fuel Deliver pressure (Low)
Engine Fuel Temperature (high)
Engine Oil Temperature (above Normal)
Transmission Oil Level (high)
Auxiliary water Pump Pressure (high)
Auxiliary Water Pump Pressure (low)
Brake ABS Valve (high)
Battery Voltage (low)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for controlling an autonomous commercial highways vehicle, comprising:
   detecting a failure of a first component based on a first signal;
   classifying, by an automated driving system on the vehicle, a severity of the failure of the first component;
   determining to stop the vehicle, by the automated driving system on the vehicle, if the severity of the failure of the first component exceeds a threshold severity level;
   determining an emergency stopping distance, by the automated driving system on the vehicle, based on the severity of the failure of the first component, a current momentum of the vehicle, and an effect of the failure of the first component on a maximum coasting distance;
   determining, by the automated driving system on the vehicle, a stopping location within the emergency stopping distance; and
   stopping the vehicle, by the automated driving system on the vehicle, at the stopping location.

2. The method of claim 1, further comprising confirming the failure of the first component based on a change in a second signal.

3. The method of claim 2, wherein confirming the failure of the first component comprises determining that the change in the second signal is correlated to a change of the first signal associated with the failure.

4. The method of claim 2, wherein the first signal is from a first sensor and the second signal is from a different, second sensor.

5. The method of claim 4, wherein confirming the failure of the first component comprises:
   inferring, based on an inference rule associated with the failure of the first component, an expected change of the second sensor; and
   determining, based on the second signal, that the expected change has occurred.

6. The method of claim 1, wherein determining the emergency stopping distance based on the severity and the current momentum of the vehicle comprises determining an effect of the failure of the first component on a minimum stopping distance.

7. The method of claim 1, wherein determining the emergency stopping distance based on the severity and the current momentum of the vehicle comprises determining the maximum coasting distance of the vehicle without further energy provided by an engine of the vehicle.

8. The method of claim 1, wherein stopping the vehicle at the stopping location comprises:
   determining a route between a current vehicle position and the stopping location based on at least one of a vision system, radar system, or lidar system;
   determining that the route is clear of obstacles; and
   controlling a steering system and a braking system of the vehicle to follow the route.

9. The method of claim 8, further comprising defueling an engine of the vehicle before controlling the steering system and the braking system.

10. The method of claim 8, further comprising shifting a transmission of the vehicle into a lower gear than a current gear or into a neutral gear before controlling the steering system and the braking system.

11. The method of claim 8, wherein the stopping location is off of a designated highway lane and wherein determining the route comprises determining to leave the designated highway lane.

12. An emergency control system for an autonomous commercial highway vehicle, comprising:
   a memory; and
   a processor communicatively coupled to the memory and configured to:
      detect a failure of a first component based on a first signal from a first, sensor of a plurality of sensors that each monitor a respective component of the vehicle;
      classify a severity of the failure of the first component;
      determine to stop the vehicle if the seventy of the failure of the first component exceeds a threshold severity level;
      determine an emergency stopping distance, based on the severity of the failure of the first component, a current momentum of the vehicle, and an effect of the failure of the first component on a maximum coasting distance;
      determine a stopping location within the emergency stopping distance; and
      control one or more vehicle components to stop the vehicle at the stopping location.

13. The emergency control system of claim 12, wherein the processor is configured to confirm the failure of the first component based on a change in a second signal from a second sensor of the plurality of sensors.

14. The emergency control system of claim 13, wherein the processor is configured to determine that the change in the second signal is correlated to a change of the first signal associated with the failure.

15. The emergency control system of claim 13, wherein the processor is configured to:
   infer, based on an inference rule associated with the failure of the first component, an expected change of the second sensor; and
   determine, based on the change in the second signal, that the expected change has occurred.

16. The emergency control system of claim 12, wherein the processor is configured to:
- determine a route between a current vehicle position and the stopping location based on at least one of a vision system, radar system, or lidar system;
- determine that the route is clear of obstacles; and
- control a steering system and a braking system of the vehicle to follow the route.

17. The emergency control system of claim 16, wherein the stopping location is off of a designated highway lane and wherein the processor is configured to determine a route that leaves the designated highway lane.

18. The emergency control system of claim 16, wherein the processor is configured to determine the emergency stopping distance based on the severity and the current momentum of the vehicle by:
- determining an effect of the failure of the first component on a minimum stopping distance; and
- determining a coasting distance of the vehicle without further energy provided by an engine of the vehicle.

19. An autonomous commercial highway vehicle, comprising:
- a plurality of sensors that each monitor a respective component of the vehicle;
- a data bus that carries signals reported from the plurality of sensors;
- a memory; and
- a processor communicatively coupled to the data bus and the memory and configured to:
  - detect, via the data bus, a failure of a first component based on a first signal;
  - classify a severity of the failure of the first component;
  - determine to stop the vehicle if the severity of the failure of the first component exceeds a threshold severity level;
  - determine an emergency stopping distance based on the severity of the failure of the first component, a current momentum of the vehicle, and a maximum coasting distance of the vehicle without further energy provided by an engine of the vehicle;
  - determine a stopping location within the emergency stopping distance; and
  - control one or more vehicle components to stop the vehicle at the stopping location.

* * * * *